Patented Sept. 10, 1940

2,214,352

UNITED STATES PATENT OFFICE 2,214,352

PROCESS FOR THE PRODUCTION OF CONDENSATION PRODUCTS CONTAINING ONIUM GROUPS

Conrad Schoeller, Heinrich Ulrich, and Ernst Ploetz, Ludwigshafen-on-the-Rhine, Germany, assignors, by mesne assignments, to General Aniline & Film Corporation, New York, N. Y., a corporation of Delaware No Drawing. Application June 17, 1936, Serial No. 85,818. In Germany June 22, 1935

9 Claims. (Cl. 260—584)

The present invention relates to a process for the production of condensation products containing onium groups and ether radicles suitable as assistants in the textile and allied industries.

We have found that valuable condensation products advantageously suitable in the textile and allied industries can be obtained by introducing in any desired sequence into compounds containing at least one of the hetero atoms nitrogen, phosphorus or sulphur and at least one replaceable hydrogen atom one and preferably more than one ether radicles and converting the compounds obtained into the corresponding onium compounds.

The preparation of the condensation products may be carried out by causing alkylene oxides of low molecular weight or compounds yielding or acting like alkylene oxides to act for example on quaternary ammonium compounds which contain one or more groups having reactive hydrogen atoms, as for example hydroxyl, carboxylic, amino or mercapto groups. Polyether radicles which have already been formed may also be introduced into the quaternary ammonium compounds to be used as initial materials, as for example by condensation of the compounds with polyethers which contain reactive atoms or atomic groups. For example ammonium bases containing hydroxyl or amino groups may be condensed with polyether compounds having terminal halogen atoms, as for example omega-chlor-tetraethylene glycol, or ammonium bases which contain carboxylic groups may be esterified with polyether compounds. The molecular size of the ether radicles to be introduced may be varied within wide limits; it generally speaking depends on the properties which it is desired to impart to the final products. When employing ethylene oxide or polyglycol compounds, very valuable products may be obtained for example by introducing radicles containing 1, 2, 4, 10, 20 or more ether linkages.

Ethylene oxide, propylene oxide, glycide, epichlorhydrin, dichlorhydrin, dichlordiethyl ether, glycol, glycerine, polyglycerine, glycol chlorhydrin or polyglycerine chloride, for example, may be employed for the introduction of the said polyether radicles into the said initial materials. Diverse of the said reactive compounds may also be caused to act consecutively. The condensation of the ammonium bases and the like with the said compounds is advantageously carried out in the presence of catalytically acting substances or condensing agents, such as alkali metal hydroxides, nickel sulphate, alkaline-reacting salts, such as sodium acetate, or sodium or potassium methylate or ethylate, pyridine or surface-active substances, such as bleaching earths or active carbon. The working conditions to be employed depend on the nature of the initial materials and the nature of the compounds to be condensed therewith. For example if ethylene oxide or propylene oxide be employed for the introduction of polyether radicles, it is advantageous to work in a closed vessel, if necessary under pressure. In the case of other compounds which are less volatile, as for example glycol or glycerine, a heating of the reaction components under a reflux condenser is frequently sufficient.

Products of the said kind may also be obtained by introducing polyether radicles or the like into compounds which contain nitrogen, phosphorus or sulphur atoms in the molecule and which are capable of forming onium compounds by the action of alkylene oxide of low molecular weight, glycol, glycerine or the like, the resulting compounds then being converted in known manner into quaternary compounds. For example polyether chains of high molecular weight may be introduced into compounds such as diethyl butanolamine, asymmetric dimethyl-ethylenediamine or sarcosine by the action of ethylene oxide or the like and the resulting amines subsequently converted into the corresponding quaternary compounds for example by treatment with dimethyl or diethyl sulphate or by adding on ethyl bromide or benzyl chloride. In many cases it is also possible to introduce polyether radicles by the action of alkylene oxides and the like on the said amines and the like and simultaneously to effect the formation of the corresponding quaternary compounds. The term "alkylating agent" in the claims is intended to comprise aliphatic compounds as well as aliphatic-aromatic compounds such as benzyl chloride.

Those products are especially valuable which contain in the molecule an aliphatic radicle of high molecular weight in addition to the polyether radicle or radicles. For the preparation of such products it is preferable to start with quaternary ammonium compounds already containing the said radicles. Suitable initial materials for working in this manner are for example dodecyl-dimethyl-hydroxyethyl ammonium hydroxide, stearyl-trihydroxethyl ammonium hydroxide, dimethyl-oxyethyl-diisobutyl-ammonium hydroxide, the mono-oleic acid ester of tetrahydroxyethyl ammoninum hydroxide, dodecyl-dimethyl-carboxymethyl ammonium chloride and the reaction product of octodecyl-dimethyl-chlorethyl ammonium chloride with ethylene diamine; quaternary ammonium compounds of polyamines which contain one or more pentavalent nitrogen atoms may also be used as initial materials, as for example the reaction product of dimethyl sulphate and stearyl-diethylene triamine, the quaternary ammonium compound of oleylpiperazine and the quaternary ammonium compounds which are obtainable by adding on dodecyl bromide, dodecahydroxymethyl chloride ($C_{12}H_{25}$—O—$CH_2Cl$) or dodecathiomethyl chloride ($C_{12}H_{25}$—S—$CH_2Cl$) to tetramethyl-beta-hydroxy-propylene diamine. Oleyl-dihydroxyethylamine oxide and the like are also suitable. The desired ether radicles are introduced into the said initial materials.

Amines and the like of high molecular weight containing polyether radicles may, however, also be converted into quaternary ammonium compounds by treatment for example with dimethyl sulphate and the like. Initial materials suitable for this modification of the process according to this invention are for example ethers or polyethers of stearylamine, oleylamine, dodecyl-methylamine, didodecylamine, octodecyl-ethylene diamine, dodecyl-propylene diamine, and also polyethers of amides, as for example those of the oleic acid amide of ethylene diamine, triethylene tetramine or ethylene diaminosorbitol or of the reaction product of triethylene tetramine or aminosorbitol with trichlorinated hard paraffin wax or of the oleylamide of piperazine.

If polyethers of amines of low molecular weight, as for example reaction products of ethylene oxide on dibutylamine, diaminopropanolamine, asymmetric diethyl-ethylene diamine, tetramethyl-beta-hydroxypropylene diamine or aminosorbitol, be used as initial materials, the introduction of the radicle of high molecular weight may be effected at the same time as the conversion of the compounds into quaternary ammonium compounds by employing for the conversion alkyl halides of high molecular weight, as for example octodecyl bromide or cetyl iodide.

The said compounds may contain, in addition to the said ether chains and the aliphatic radicles of high molecular weight which may consist of straight or branched carbon chains, mixed aliphatic aromatic, aromatic or heterocyclic radicles. The latter may in turn be substituted and/or interrupted by hetero atoms or groups containing the same. As substituents may be mentioned for example hydroxyl, carbonyl, carboxylic, nitro, amino, ester or mercapto groups as well as halogen atoms.

The polyethers used as initial materials or the products obtained according to this invention may be caused to react, in so far as they contain reactive groups, as for example hydroxyl, carboxylic, amino or mercapto groups, with reactive compounds, as for example chlorethane sulphonic acid, chloracetic acid, fatty acid chlorides of high molecular weight, chlorocarbonic esters, isocyanates, phosphoric acid, or sulphonating agents, such as chlorsulphonic acid, whereby products are obtained which are likewise valuable and which are in part readily soluble in water.

The process according to this invention leads to products which have the following general formula:

wherein X is a quaternary ammonium or phosphonium or a ternary sulphonium group, Y is an ether or a polyether radicle, and Z is an OH, —O-alkyl or —O-acyl group and A is an anion, the valencies of X not shown in the formula are saturated by organic radicles, at least one of the organic radicles attached to X being a high-molecular radicle. These products have a high wetting, dispersing, levelling, washing and softening power as well as a good protective colloid action. The products may therefore be employed for example as assistants for a great variety of branches of the textile, leather, paper, lacquer, tanning and rubber industries. For example they are suitable as assistants in bleaching, bucking, carbonizing, mercerizing, dyeing, and in stripping baths and in printing pastes; moreover they can be employed as mordants for textile materials to be dyed and for the treatment of dyed textiles in order to increase the fastness of the dyeings. The said products are also suitable as assistants for washing, fulling, dressing and rendering waterproof and also for matting and rendering creaseproof textiles and the like. They may also be used as additions to artificial silk spinning solutions and spinning baths and as additions to lubricants, textile oils, waxing compositions or shoe polishes. They may also frequently be employed with advantage for the purpose of combating pests, for the preparation of pharmaceutical and cosmetic products and for use as flotation agents.

It is especially advantageous to employ the said products in the dyeing baths of vat dyestuffs, substantive, acid, basic or acetate artificial silk dyestuffs because they do not produce undesirable precipitates therein.

The said compounds may be employed alone as free bases or in the form of a great variety of salts, as for example chlorides, sulphates, phosphates or salts with organic sulphonic acids or sulphuric esters or carboxylic acids of high molecular weight, such as oleic acid or the fatty acids of coconut oil. They may, however, also be employed together with other known textile assistants. As suitable additional substances may be mentioned soaps, sulphuric esters of aliphatic compounds of high molecular weight, true sulphonic acids or aromatic and high molecular aliphatic compounds, condensation products of fatty acid chlorides with albumen degradation products, aminocarboxylic acids and the like, quaternary ammonium compounds, or condensation products of alkylene oxides with organic compounds which contain hydroxyl, carboxylic, amino or mercapto groups in the molecule. Further suitable additional substances are starch, dextrine, cellulose derivatives, sulphite cellulose waste liquors, inorganic salts, such as orthophosphates, pyrophosphates, metaphosphates or Glauber's salt, glue, vegetable mucilages, resins, waxes, oils, fats, polymerized compounds, organic solvents, such as carbon tetrachloride or cyclohexanol and the like. The said condensation products may also be employed together with oxidizing agents, such as hydrogen peroxide or perborates, or reducing agents, such as sodium hydrosulphite. Preparations containing the said condensation products, as for example dyestuff preparations, soap preparations, impregnating agents and dressing agents, may also be prepared.

The following examples will further illustrate the nature of this invention but the invention is not restricted to these examples.

*Example 1*

1 molecular proportion of stearylamine is condensed at from 50° to 70° C. with 10 molecular proportions of ethylene oxide in the presence of a catalyst, as for example sodium methylate. The ethylene oxide may be led in in the gaseous phase; the whole amount of ethylene oxide may, however, also be caused to act at once in the liquid phase in a closed vessel. A yellow-brown, clear, solid mass is obtained. The product is then alkylated by treatment with dimethylsulphate. The quaternary ammonium compound is obtained in the form of a water-soluble, brown colored oil, which is an excellent levelling agent for vat dyestuffs.

The product obtained is also very suitable as an addition to bottoming (priming) or developing baths in the production of azo dyestuffs.

When employing as initial material the reaction product of about 20 molecular proportions of ethylene oxide and 1 molecular proportion of stearylamine and working in an otherwise identical manner, a very good levelling and thorough dyeing agent for substantive dyestuffs is obtained.

*Example 2*

1 molecular proportion of ethylene diamine is treated at 80° C. under a pressure of 5 atmospheres with about 12 molecular proportions of ethylene oxide. The water-soluble wax-like product obtained is reacted with 1 molecular proportion of octodecyl bromide. A water-soluble viscous oil is obtained which is a very good levelling agent for acid dyestuffs as well as for complex chromium compounds of acid dyestuffs.

Instead of ethylene diamine, beta.beta-dibutyl-ethylene-diamine may be employed; a product having similar properties is thus obtained.

*Example 3*

6 molecular proportions of ethylene oxide are caused to act on 1 molecular proportion of dodecyl-dimethyl-hydroxy-ethyl ammonium hydroxide at from 60° to 80° C. under a pressure of 5 atmospheres in the presence of 0.5 per cent of caustic soda solution. A water-soluble product having high wetting and washing power is thus obtained.

If stearyl-trihydroxyethyl ammonium hydroxide be condensed in the said manner with from 1 to 2 molecular proportions of ethylene oxide, a product which is also water-soluble is obtained which is especially suitable as a softening agent for artificial silk.

If about 8 molecular proportions of ethylene oxide be caused to act on stearyl-trihydroxylethyl ammonium hydroxide and the resulting base be converted into the salt of stearic acid, a water-soluble product is obtained which is also eminently suitable as a softening agent, for example for viscose artificial silk. The soap of stearylamine and stearic acid may also be used as initial material for the condensation with ethylene oxide, a product having similar properties being thus obtained.

*Example 4*

About 10 molecular proportions of propylene oxide are brought into reaction during the course of four hours with tetrahydroxyethyl ammonium hydroxide under pressure at from 70° to 90° C., the maximum pressure being from 4 to 5 atmospheres. A product which no longer has a basic reaction is obtained which is very suitable for making difficultly soluble dyestuffs, as for example basic dyestuffs, into pastes and which may be employed with advantage as an addition to printing pastes.

*Example 5*

1 molecular proportion of methyldodecylamine is caused to react with about 10 molecular proportions of ethylene oxide at elevated temperature with an addition of 0.5 per cent of sodium ethylate and the resulting water-soluble condensation product is then treated with dimethyl sulphate for the purpose of forming the quaternary ammonium compound. A product is obtained which has an excellent levelling power for vat dyestuffs and which may be employed with advantage in dyeing with Naphthol AS.

Vat dyestuffs may be stripped to a great extent from textile fibres in blind vats which contain small amounts of the above ammonium compound, advantageously with an addition of oleyl-sarcosine.

*Example 6*

3 molecular proportions of ethylene oxide are caused to act on 1 molecular proportion of oleylamine at elevated temperature after an addition of 0.5 per cent of caustic soda and the resulting condensation product is treated with dimethyl sulphate in such an amount that the quaternary ammonium compound is formed. The latter is a washing agent of good efficiency.

If the reaction product of 12 molecular proportions of ethylene oxide to 1 molecular proportion of oleylamine is treated with dimethylsulphate in a like manner an excellent fulling agent for alkaline and acid baths is obtained. While employing the said product together with soap in hard water the precipitation of calcium soap is avoided.

*Example 7*

43 parts of dimethylsulphate are slowly added to the condensation product of 93 parts of oleylamine and 62 parts of ethylene oxide at from 20° to 30° C. while stirring. The methylsulphuric acid salt of the quaternary ammonium compound is then mixed at from 0° to 10° C. with 40 parts of chlorosulphonic acid. After sulphonation 300 parts of 40 per cent caustic soda solution are introduced into the sulphonation mixture; water-soluble paste is thus obtained.

Mercerized calico is dyed while employing 1 per cent of Hydronblau R Pulver (Schultz, Farbstofftabellen 1930, Vol. I, No. 1111) and while adding 0.1 part of the above 40 per cent paste per liter of the dyeing bath. In this manner a very equal dyeing is obtained.

*Example 8*

12 molecular proportions of ethylene oxide are caused to react with 1 molecular proportion of stearyl amine after adding 0.5 per cent of sodium ethylate. Then 1 molecular proportion of ethylene chlorhydrin is added to the reaction mixture which is heated for 2 to 3 hours on the boiling water bath. In this manner a brown viscous oil soluble in water is obtained which possesses an excellent washing power in neutral as well as in acid and alkaline baths particularly for wool and cotton. The said product may be employed therefore advantageously for treating of wool and for use in laundries. The product may also advantageously be employed together with enzymatic preparations, perborates, salts of phosphoric acid such as pyro- or metaphosphates and the like.

*Example 9*

15 molecular proportions of ethylene oxide are caused to react with 1 molecular proportion of the amide obtained by condensing 1 molecular proportion of oleic acid and 1 molecular proportion of ethylene diamine or phenyldiamine. The condensation product obtained is treated with dimethylsulphate; thus a product is obtained which possesses a high dispersing power.

Instead of the said amides for example dodecylpropylene diamine or paraaminophenol may also be employed as initial materials. Also in this manner valuable cleansing and wetting agents are recovered.

What we claim is:

1. A condensation product suitable as assistant in the textile and related industries consisting essentially of anoleyl ammonium compound containing at least one polyethenoxy radicle.

2. A condensation product suitable as assistant in the textile and related industries consisting essentially of a quaternary ammonium compound of an amide of a polyamine containing at least one polyethenoxy radicle.

3. The process for the production of condensation products which comprises causing a low-molecular alkylene oxide to react with a substance of the following formula:

wherein X is an atom selected from the class consisting of nitrogen, phosphorus and sulfur atoms, R₁ is a high-molecular aliphatic radical, R₂ is a substituent selected from the class consisting of hydrogen and hydroxy alkyl radicals, and R₃ is one of the substituents selected from the class consisting of hydrogen and alkyl, aryl, aralkyl and heterocyclic radicals, in the case of sulfur compounds R₃ being absent, and converting the product obtained, in any known manner, into an onium compound.

4. The process for the production of condensation products which comprises causing ethylene oxide to react with a substance of the following formula:

$$R_1-\underset{\underset{R_3}{|}}{X}-R_2$$

wherein X is an atom selected from the class consisting of nitrogen, phosphorus and sulfur atoms, R₁ is a high-molecular aliphatic radical, R₂ is a hydroxy alkyl radical, and R₃ is one of the substituents selected from the class consisting of hydrogen and alkyl, aralkyl, aryl and heterocyclic radicals, in the case of sulfur compounds R₃ being absent, and converting the said substance in any stage, in any known manner, into an onium compound.

5. The process for the production of condensation products which comprises causing at least two molecular proportions of ethylene oxide to react with a substance of the following formula:

wherein R₁ is a high-molecular aliphatic radical, R₂ is a hydroxy alkyl radical, and R₃ is one of the substituents selected from the class consisting of hydrogen and alkyl, aralkyl, aryl and heterocyclic radicals, and converting the said substance in any stage, in any known manner, into an onium compound.

6. The process for the production of condensation products which comprises causing a low-molecular alkylene oxide to react with a substance of the following formula:

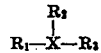

wherein X is an atom selected from the class consisting of nitrogen, phosphorus and sulfur atoms, R₁ is a high-molecular aliphatic radical, R₂ is a substituent selected from the class consisting of hydrogen and hydroxy alkyl radicals, and R₃ is one of the substituents selected from the class consisting of hydrogen and alkyl, aralkyl, aryl and heterocyclic radicals, in the case of sulfur compounds R₃ being absent, and peralkylating the compound obtained by treating with an alkylating agent.

7. Condensation products suitable as assistants in the textile and related industries consisting essentially of compounds of the general formula:

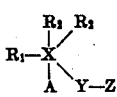

wherein X is an atom selected from the class consisting of nitrogen, phosphorus and sulfur atoms, R₁ is a high-molecular aliphatic radical, R₂ is a radical selected from the class consisting of alkyl, aralkyl, aryl and heterocyclic radicals, in the case of sulfur compounds one of the radicals R₂ being absent, Y is a radical selected from the class consisting of an alkylene ether and a polyalkylene ether radical, and Z is a group selected from the class consisting of OH, —O-alkyl and O-acyl groups, and A is an anion.

8. Condensation products suitable as assistants in the textile and related industries consisting essentially of compounds of the general formula:

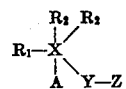

wherein X is an atom selected from the class consisting of nitrogen, phosphorus and sulfur atoms, R₁ is a high-molecular aliphatic radical, R₂ is a radical selected from the class consisting of alkyl, aralkyl, aryl and heterocyclic radicals, in the case of sulfur compounds one of the radicals R₂ being absent, Y is a radical selected from the class consisting of an ethyl ether and polyethyl ether, and Z is a group selected from the class consisting of OH, —O-alkyl and O-acyl groups, and A is an anion.

9. Condensation products suitable as assistants in the textile and related industries consisting essentially of compounds of the general formula:

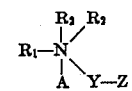

wherein R₁ is a high-molecular aliphatic radical, R₂ is a radical selected from the class consisting of alkyl, aralkyl, aryl and heterocyclic radicals, Y is a radical selected from the class consisting of an alkylene ether and a polyalkylene ether radical, and Z is a group selected from the class consisting of OH, —O-alkyl and O-acyl groups, and A is an anion.

CONRAD SCHOELLER.
HEINRICH ULRICH.
ERNST PLOETZ.